United States Patent [19]

Damico et al.

[11] Patent Number: 4,855,001

[45] Date of Patent: Aug. 8, 1989

[54] STRUCTURAL ADHESIVE FORMULATIONS AND BONDING METHOD EMPLOYING SAME

[75] Inventors: Dennis J. Damico; Ruth M. Bennett, both of Erie, Pa.

[73] Assignee: Lord Corporation, Erie, Pa.

[21] Appl. No.: 13,057

[22] Filed: Feb. 10, 1987

[51] Int. Cl.[4] .................................................. C09J 5/02
[52] U.S. Cl. .............................. 156/307.3; 156/330; 156/332; 428/416; 428/463; 523/458; 524/508; 524/560; 525/107; 525/111; 525/132; 525/138; 526/98; 526/107
[58] Field of Search ................. 156/307.3, 330, 332; 523/458; 524/508, 560; 525/107, 132, 111, 138; 526/98, 107; 428/416, 463

[56] References Cited

U.S. PATENT DOCUMENTS

| | | | |
|---|---|---|---|
| 3,287,205 | 11/1966 | Bugel | 428/416 |
| 3,627,779 | 12/1971 | Sandstedt | 428/463 |
| 3,855,040 | 12/1974 | Malofsky | 156/332 |
| 4,182,644 | 1/1980 | Briggs et al. | 156/332 |
| 4,217,254 | 8/1980 | Legue | 525/130 |

*Primary Examiner*—John J. Gallagher
*Attorney, Agent, or Firm*—Larson and Taylor

[57] ABSTRACT

A one-component heat stable, adhesive for metal surfaces such as iron, zinc, copper, cadmium and their alloy will cure upon contact with the metal surface. The adhesive composition includes olefinically unsaturated monomer; at least one phenoxy resin together with other reactive or non-reactive polymers; an acidic material; a compound containing sulfonyl halide group; and a compound containing a transition metal, in particular $TiO_2$. The adhesive composition cures rapidly upon contact with a metal surface to form an adhesive bond between the surfaces. The adhesive composition is especially useful as an adhesive for galvanized steel parts subjected to elevated paint curing temperatures.

15 Claims, No Drawings

STRUCTURAL ADHESIVE FORMULATIONS AND BONDING METHOD EMPLOYING SAME

This invention relates to heat stable structural adhesive formulations. More particularly, the invention relates to shelf-stable, one-package heat stable acrylic structural adhesive compositions useful for bonding galvanized steel.

Acrylic structural adhesives are well known articles of commerce which are extensively used commercially for bonding metal and plastic materials. Recently, acrylic structural adhesives have found growing use in the automotive industry where the adhesive bonding of galvanized steel is replacing welding and mechanical fastening techniques. However, these applications give rise to unique requirements not easily met by previously available adhesives. These new requirements and associated problems have resulted in a need for new approaches in acrylic adhesive development designed for the specific application and conditions in which the adhesive will be employed, particularly in the bonding of galvanized steel. The production of joined parts from galvanized steel often includes a paint curing cycle subsequent to the joining operation, which curing cycle occurs at temperatures of about 400° F. Where the parts are adhesively joined, the adhesive must be stable under paint curing conditions. Workers in the field of acrylic adhesives have struggled with the problem of formulating an adhesive which incorporates the known advantages of acrylic adhesives but includes improved heat stability. The acrylic adhesives typically comprise a mixture of one or more olefinic reactive monomers and curing agents, with cure or polymerization being effected through a free radical or ionic polymerization mechanism. The adhesives preferably contain one or more polymeric materials which may or may not be reactive, that is, capable of being polymerized per se or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

To achieve the desired adhesive performance, particularly with respect to bonding galvanized steel, a number of approaches have been pursued. Unfortunately, these approaches have critical limitations, particularly in actual production situations. One part heat cured epoxies, for instance, are relatively slow curing and require temperatures in excess of 350° F. Induction heating has been useful in speeding up the production process but it is very expensive. Two part systems will cure without sophisticated and expensive induction curing techniques but their curing time is slow. Anaerobic adhesives and cyanoacrylates, although one part, tend to be expensive and cure only in minimal glue line thicknesses. Moisture cure urethanes are very slow to cure and fail to cure altogether if large bond areas are involved.

Recently, it has been shown that acrylic adhesives can be developed utilizing the metal surface to effect cure via the catalytic activity of that surface. This approach is fundamentally different than anaerobic adhesives which begin to cure via free radical mechanisms when oxygen is removed and also different than cyanoacrylates which cure ionically via reactions with "basic" species (e.g. water) on surfaces.

There have been many attempts to utilize the catalytic effect of metals in adhesive applications. For example, it has been proposed to pretreat non-catalytic surfaces with a catalytic salt solution, such as the resinates of iron, copper or cobalt, see Lees U.S. Pat. No. 3,658,254, column 1, lines 29–52. The Lees patent itself is directed to two-package anaerobic acrylic adhesive compositions whose effectiveness was not influenced by the catalytic or non-catalytic character of the substrate. Skoultchi, in U.S. Pat. No. 3,880,956 and 3,957,561 discloses anaerobic acrylic adhesive compositions which are activated by contact with metal surfaces. The compositions of Skoultchi U.S. Pat. No. 3,880,956 are single-package anaerobic compositions containing diazonium salt catalysts which cure through a free radical polymerization mechanism when excluded from air or oxygen and in contact with certain metal surfaces such as iron, copper, tin, aluminum, silver, alloys of these metals and cadmium, chromium, nickel and zinc chromate platings. Skoultchi U.S. Pat. No. 3,957,561 discloses one-package anaerobic compositions utilizing a two-component catalyst system comprising at least one diazosulfone compound and o-sulfobenzimide which cure through a free radical polymerization mechanism when the adhesive is excluded from air or oxygen and in contact with active metal surfaces (the same surfaces described in Skoultchi '956). On the other hand, Skoultchi, in U.S. Pat. No. 4,052,244 utilized copper in the form of a copper salt of saccharin or p-toluenesulfonic acid to provide two-package anaerobic adhesives whose cure was otherwise not dependent on substrate composition. In another development, Skoultchi, in U.S. Pat. No. 4,081,308 discloses two-package anaerobic adhesives which utilize, in one package, copper saccharinate or saccharin in combination with a soluble copper salt, and, in the other package, an alpha-hydroxy sulfone, an alpha-aminosulfone or mixtures of such sulfones, as catalytic agents for the free radical curing of the anaerobic acrylic adhesive compositions. The cure of the Skoultchoi 4,081,308 compositions is independent of substrate composition.

Despite the advantages of acrylic structural adhesives in the prior art, their success has been restrained due to inadequate heat stability. In practice, such adhesives should withstand temperatures at least as high as those used to bake the paint coatings on the metal being bonded, without loss of shear strength. Satisfactory heat stability has not been realized in acrylic adhesives of the prior art.

The present invention provides novel, high heat stable, one-package acrylic adhesives which cure at ambient temperature when brought into contact with certain metal surfaces, whether or not air or oxygen is excluded. In particular, it has been discovered the acrylic adhesives either phenoxy resins or titanium dioxide exhibit surprisingly improved heat stability. In yet another aspect of the invention, it has been found that the presence of both the phenoxy resin and titanium dioxide provides even further heat stability. The inclusion of $TiO_2$ in the adhesive formulation is a preferred embodiment of the instant invention. $TiO_2$, particularly in combination with adhesive formulatons containing phenoxy resin, substantially increases the heat stability of the formulations of the instant invention, providing surprising advantages from their utitization. Useful amounts of $TiO_2$ for heat stability purposes are in the range of 1-50, preferably 10 to 25 percent by weight.

The invention utilizes a combination of monomers, polymers, inoganics, initiators and stabilizers. In particular, the single-package adhesive compositions of this invention comprise, in admixture, (A) at least one olefinic monomer, preferably tetrahydrofurfuryl methacrylate;

(B) titanium dioxide or at least one phenoxy resin comprised of recurring units represented by the formula

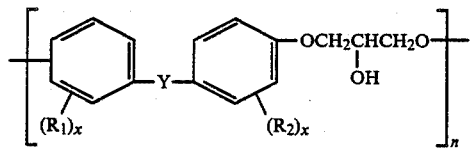

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer of 1-4; n is 10 to 250; or mixtures of titanium dioxide and said phenoxy resin;

(C) a polymeric material selected from the group consisting of
   (1) at least one unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
   (2) at least one butadiene-based elastomeric polymeric material selected from the group consisting of
      (a) homopolymer of butadiene;
      (b) copolymer of butadiene and at least one monomer copolymerizable therewith selected from the group consisting of styrene, acrylonitrile, methacrylonitrile and mixtures thereof;
      (c) modified elastomeric polymeric material selected from the group consisting of butadiene homopolymer and copolymer as previously defined, such homopolymer and copolymer having been modified by copolymerization thereof with by trace amounts up to 5 percent by weight, based on weight of modified elastomeric material, of at least one functional monomer; and
      (d) mixtures thereof;
   (3) at least one polymer-in-monomer syrup consisting essentially of
      (a) from 10 to 98 percent by weight of at least one olefinically unsaturated monomeric compound having at least one

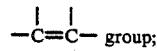 group;

(b) from 2 to 90 percent by weight of at least one polymer derived from such (3)(a) monomers;
      (c) from zero to 30 percent by weight of at least one polymer containing the group $(CH_2-CCl=CHCH_2)_n$ wherein n is an integer; wherein (3)(b) is present as a partial polymerization product of (3)(a) or of (3)(a) in the presence of (3)(c); the mixture of (3)(a) and (3)(b) or of (3)(a), (3)(b) and (3)(c) being a syrup of polymer dissolved or dispersed in unpolymerized monomer, in which syrup the amount of (3)(b) derived from (3)(a) is in the range from 2 to 90 percent, based on the total weight of (3)(a), (3)(b) and (3)(c);

(4) at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;

(5) at least one homopolymer or copolymer of at least one olefinically unsaturated monomer selected from the group consisting of styrene and alkyl or hydroxyalkyl esters of acrylic and methacrylic acid, said ester having one to 18 carbon atoms in the alkyl moiety; and (6) mixtures of such polymeric materials;

(D) an acidic compound having at least one organic or inorganic acid group;

(E) at least one compound containing at least one sulfonyl halide group having the structure

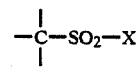

wherein X is selected from the group consisting of chlorine, bromine or iodine, with chlorine being currently preferred; and (F) at least one organic or inorganic compound containing at least one reducible transition metal, said metal having its valence electrons in a "d" subshell, said metal being selected from the elements of classes Ib, IIb, IIIb, IVb, Vb, VIb, VIIb, or VIII on the periodic chart of the elements; with copper, zinc, iron, cobalt and nickel being preferred, with copper being especially preferred, said metal being most preferably in its highest oxidation state; and wherein the amount of said olefinic monomer is in the range from 10 to 90, preferably 17 to 87, percent by weight; the amount of said phenoxy based copolymer or homopolymer is in the range of 1 to 30, preferably 5 to 15, percent by weight; the amount of said acidic compound is in the range from 0.05 to 20, preferably 0.1 to 15, percent by weight; and the amount of said sulfonyl halide- containing compound is in the range from 0.05 to 5, preferably 0.5 to 2, percent by weight; and the amount of said transition metal compound is in the range from 0.05 to 5, preferably 0.5 to 2.5, percent by weight; and the amount of the olefinic urethane reaction product may vary from 10 to 90, preferably 13 to 83, percent by weight when employed, the amount of the butadiene-based elastomeric polymeric material may vary from 1 to 30, preferably 7 to 27, percent by weight; the amount of titanium dioxide may vary from 1 to 50, preferable 10 to 25, percent by weight.

The adhesive compositions of the invention can optionally contain up to 60, preferably not more than 30, percent by weight, based on total weight of the adhesive composition, of at least one polymeric material having an intrinsic viscosity in the range from 0.1 to 1.3, such polymeric material being obtained from the polymerization or copolymerization of at least one styrene monomer, acrylic monomer, substituted acrylic monomer, olefinically-unsaturated non-acrylic monomer, or mixtures thereof; up to 40, preferably not more than 30, percent by weight, based on total weight of the adhesive composition, of at least one elastomeric material having a second order glass transition temperature below 5° C.; and up to 10 percent by weight of at least one unsaturated dicarboxylic acid ester. The latter recited optional ingredient is based also on the total weight of the adhesive composition.

The adhesives of the invention can contain a wide variety of inorganics functioning as fillers and modifiers as may be preferred in a specific application. For example, fumed silica may be added to the composition to thicken the composition for handling and ease of application purposes. Further, the adhesive compositions may include stabilizers, such as anti-oxidants, to improve the shelf-life of the adhesive as packaged in an amount sufficient to inhibit degradation of the adhesive composition.

DESCRIPTION OF THE PREFERRED EMBODIMENTS

According to the present invention, an adhesive composition is provided which may be employed to bond metal surfaces together. The adhesive exhibits good bonding properties with zinc, copper, cadmium, iron, alloys of such metals metallic coatings or platings of such metals. The surfaces of these metals, alloys and metallic platings can, for conveninece be called "active surfaces" and this term is to be understood to include but not be limited to the mentioned metal species. The adhesive exhibits good weathering characteristics. Adhesive compositions prepared according to this invention are useful as a thread lock material to be applied to the threads of a threaded fastener to form a tight bond between the fastener and its threaded receiving member, e.g., a bolt and nut. Other adhesive compositions prepared according to the invention are useful in the construction of building panels where the bonding of galvanized steel sheets to galvanized steel sheets in desired, as well as in bonding such galvanized sheets to other structural members. The use of structural fasteners avoids the need for unsightly weld marks, exposed threaded fasteners, exposed rivets, etc. Structural adhesives may be substituted in part for other mechanical fasteners, for example, in the transportation industry where exterior panels are secured to frame members or to other panel members by means of exposed fasteners, such as rivets, threaded fasteners, welding, etc. A number of the welds, rivets or threaded fasteners can be eliminated and their function can be performed by appropriate reliable structural adhesives in accordance with the present invention.

Monomeric liquid olefinic compounds suitable for use in the adhesive compositions of the invention are characterized by the presence of at least one

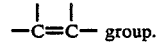
group.

The olefinic unsaturated group is preferably a vinyl group, with acrylic and substituted acrylic monomers being currently preferred. When olefinic monomers which do not contain acrylic or substitute acrylic groups are employed, they should be used in an amount not exceeding 50, preferably not more than 25, percent by weight, based upon the total weight of the adhesive composition. Representative olefinic monomers include, without limitation, tetrahydrofurfuryl methacrylate, methyl methacrylate, butyl methacrylate, ethyl acrylate, diethylene glycol dimethacrylate, methacrylic acid, acrylic acid, acrylonitrile, methacrylonitrile, styrene, vinyl acetate, chlorostyrene, glycidyl methacrylate, itaconic acid, acrylamide, methcrylamide, vinylidene chloride, 2,3-dichloro-1,3-butadiene, 2-chloro-1,3-butadiene, methylstryrene and n-butylstyrene, with tetrahydrofurfuryl methacrylate preferred.

The phenoxy resins employed in the present invention are prepared from the reaction of diphenols and epichlorohydrin using a strong base. Suitable diphenol monomers include all those derived from 4,4'-isopropylidenediphenol (bisphenol A). Alternatively, the phenoxy resins may be prepared by the polymerization of a diphenol and the diglycidylether of a diphenol. The phenoxy resins and their preparation are well known in the art and further described in Encyclopedia of Polymer Science & Technology, Vol. 10, p. 111 (1969).

An exemplary phenoxy resin used in the specific example, described is PKHJ, a commercial product available through the Union Carbide Company and has the following chemical structure:

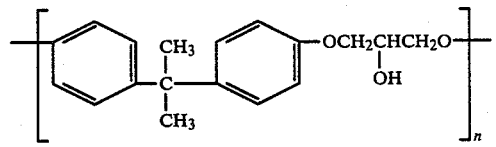

Phenoxy based resins are an essential component in the instant invention and provide the adhesive compositions described with excellent heat stability thereby expanding the applicability of acrylic single-package structural adhesives.

The acidic compounds which are essential to the practice of this invention can include substantially any organic or inorganic acid having at least one acid group, and includes organic partial esters of such acids. The acidic compounds are in the nature of Bronsted acids, that is, compounds which can donate a proton. Suitable acidic compounds preferably have a pKa in the range from 0.5 to 6, most preferably in the range from 1.5 to 5. The acidic compounds should also be reasonably soluble in the adhesive compositions of the invention to facilitate homogeneous distribution of the acid throughout the composition. The selection of the acidic component is a function of the substrate to be bonded, as well as the desired adhesive performance, and provides the adhesive chemist considerable latitude in formulating adhesive compositions specifically designed for any particular end use. For example, organic acids, as well as organic partial esters of such acids are preferred for bonding ferrous metals and their alloys, but adhesives containing such organic acids can be prepared according to the invention which are effective bonding agents for non-ferrous metals, such as galvanized steel. Conversely, the inorganic acids, and the organic partial esters of such acids, are preferred for bonding non-ferrous metals and their alloys, but adhesives containing such inorganic acids can also be prepared which are useful for bonding ferrous metals and their alloys. In the general case, acidic compounds which contain both at least one acid group and at least one olefinically-unsaturated moiety are preferred.

Representative acidic compounds which are suitable for use in the practice of the invention include phosphoric acid, 2-hydroxyethyl methacrylate partial ester of phosphoric acid, 2-hydroxyethyl acrylate partial ester of phosphoric acid, phosphoric acid, benzenephosphonic acid, phosphorous acid, sulfuric acid, sulfurous acid, 2-ethylhexanoic acid, formic acid, acetic acid, butyric acid, hexanoic acid, naphthenic acid, lauric acid, linoleic acid, valeric acid, toluene sulfonic acid, nitrotoluene sulfonic acid, dichloroacetic acid, trichloroacetic acid, acetoacetic acid, acrylic acid, methacrylic acid, aminobenzosulfonic acid, maleic acid, malonic acid, phthalic acid, suberic acid, succinic acid and vinyl acetic acid.

The inorganic acids and organic partial esters of inorganic acids are currently preferred for use with non-ferrous metals such as zinc, copper, cadmium, their alloys and platings, with olefinic partial esters of inorganic acids being currently preferred. Adhesive compositions prepared in accordance with this invention which contain such inorganic acids typically provide better adhesion when bonding non-ferrous metals than is obtained from the use of organic acids. Adhesive compositions containing the inorganic acids provide lower adhesion values with ferrous metal surfaces than is obtained from the use of organic acids; however, the inorganic acid-containing adhesives are sufficiently effective in bonding ferrous metals that they can be utilized in applications such as thread-locking of iron bolts and nuts.

As noted, the organic acids and inorganic partial esters of organic acids are currently preferred for structural bonding of ferrous metals, and can also be used for structural bonding of non-ferrous metals, although the adhesion provided by such adhesive compositions in this latter case is typically less than that provided by the use of inorganic acids.

In the general case, it has been noted that stronger acids, as well as larger quantities of any acid, tend to increase the rate at which the adhesive compositions cure. The use of strong acids, e.g., those having $p_a$ values of 1 or less, particularly in large amounts, can lead to corrosion problems and tends to deactivate the adhesives, possibly through chelate formation. The use of large amounts of any given acid also tends to give lower adhesion values; but it has been observed that such reductions in adhesion values is not as great when the acidic compound contains one or more polymerizable olefinically unsaturated groups. Thus some degree of experimentation may be required in selecting the acid and the amount of the acid, in order to achieve an acceptable compromise of properties. Currently, it is preferred that the acidic compound be employed in amounts in the range from 0.05 to 20, preferably 0.1 to 15, percent by weight, based on the total weight of the adhesive components (A)-(F), inclusive, as recited, supra. In those cases where the acid does not contain polymerizable moities, the amount of the acid is preferable in the range from 0.05 to 5 percent by weight.

The sulfonyl halide-containing compounds are also essential to the practice of this invention and will be used in an amount in the range from 0.05 to 5, preferably 0.5 to 2, percent by weight, based on components (A)-(F), inclusive, of the compositions. As noted, the halide moiety can be chlorine, bromine or iodine with the sulfonyl chlorides being currently preferred. The sulfonyl halides can be mono- or poly-functional and can be aliphatic sulfonyl halides having from one to 12 or more carbon atoms, aromatic sulfonyl halides having from 1 to 3 aromatic nuclei and containing from 6 to 24 carbon atoms. Representative sulfonyl halide containing compounds include biphenyl disulfonyl chloride, trichlorobenzene sulfonyl chloride, p-toluene sulfonyl chloride, benzene sulfonyl chloride, hexadecane sulfonyl chloride, diphenyl ether-4,4'-sulfonyl chloride, and the corresponding sulfonyl bromides and iodides. Monomeric sulfonyl halides are currently preferred, with the aromatic sulfonyl halides, particularly p-toluene sulfonyl chloride, being especially preferred.

Equally as essential as are the compounds containing at least one sulfonyl group and the acidic compounds, both supra, are compounds containing at least one transition metal. As used herein, transition metals are those metals which have their valence electrons in a "d" subshell. Such metals are found in classes Ib-VVII b and VIII on the periodic chart of elements. The preferred metals are copper, zinc, cobalt, vanadium, iron and manganese. The metal should be in a higher oxidation state, with the highest oxidation state being preferred in all cases. Inorganic compounds containing the transition metals can be used, such as the metal salts exemplified by the bromides, chlorides, phosphates, sulfates, sulfides and oxides of the transition metals. Likewise, organic compounds containing the transition metals can be used, such as transition metal salts of organic mono- and poly-carboxylic acids and mono- and poly-hydroxy compounds, such as cupric acetate, cupric maleate, cupric hexoate, iron naphthate, cobaltous and cobaltic naphthenate and the like. Particularly preferred organic derivatives are sulfimide and sulfonamide compounds which contain the transition metal, such as the currently preferred cupric sacchrinate. This is but a partial listing of suitable inorganic and inorganic salts; however, other useful salts will be readily obvious to those skilled in the art. Except for $TiO_2$, the transition metal compounds will be employed in the adhesive compositions of this invention in a range from 0.05 to 5, preferably 0.5 to 2.5, percent by weight, based on total weight of adhesive components (A)-(F), inclusive.

The transition metal-containing organic compounds are typically more soluble in the adhesive compositions of this invention, and they are preferred compounds. It is important that the transition metals compound, be it organic or inorganic, has some degree of solubility, either in the adhesive composition itself or in an inert solvent which is preferably compatible with the adhesive compositions. Because of the limited solubility of at least some usable transition metal compounds, it can be advantageous to dissolve the compound in the adhesive or inert solvent and filter off the undissolved material.

Although adhesive compositions of improved heat stability are obtained with the phenoxy resins alone, further improvement is obtained by including about 1 to 50%, preferably 10 to 25% percent by weight titanium dioxide.

The adhesive compositions may also contain stabilizers such as hydroquinone, t-butyl catechol and other well known stabilizers to improve shelf life of the composition in concentrations in the range of 0-5 weight percent.

Thickeners such as fumed silica are included to thicken the composition for handling and application. A preferred thickener is fumed silica comprising from 0.2 to 10.0 weight percent of the adhesive composition. Pigments also may be added if desired.

The adhesive compositions of the invention are readily prepared by combining the ingredients using any conventional mixing device to obtain a mixture.

The adhesive coatings may be brushed, rolled, sprayed, dotted, knifed or otherwise applied to one substrate, but preferably to both substrates in a thickness not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The two metal surfaces and the interposed adhesive composition are maintained in engagement until the said adhesive composition has cured sufficiently to bond the said surfaces.

As aforementioned, polymeric materials such as those identified as C (1)–(6) are included in the adhesion composition of the invention. These polymeric material will be further described below.

The isocyanate-functional prepolymers which are employed to form olefinically unsaturated urethane reaction products for use in the practice of the invention are well known. Typically, such prepolymers are adducts or condensation products of polyisocyanate compounds having at least 2 free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least 2 free, unreacted isocyanate groups.

Polyols useful in preparing isocyanate-functional prepolymer used in the present invention preferably have an average molecular weight of 300 to 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadienestyrene) polyols and poly(butadiene) polyols; polyester polyols such as are prepard by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linessed oil and blown soya oil; and polyesterpolyols such as are prepared by the polymerization of a lactone such as caprolactone.

Polyisocyanates which can be reacted with polyols to form isocyanate-functional prepolymers for use in the present invention can be any monomeric, that is nonpolymeric, isocyanate groups, including aliphatic, cycloaliphatic and aromatic compounds. Representative polyisocyanates include, without limitation thereto, 2,4-tolylene diisocyanate, 2,6-tolylene diisocyanate, 4,4'-diphenylmethane diisocyanate, m- and p-phenylene diisocyanate, polymethylene poly(phenyl isocyanate), hexamethylene diisocyanate, 4,4'-methylene-bis(cyclohexyl isocyanate), isophorone diisocyanate, and other aliphatic cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate-functional prepolymer include, without limitation, hydroxyethyl acrylate, hydroxyethyl methacrylate, and allyl alcohol.

The butadiene-based elastomeric polymeric materials which are suitable for use in the practice of this invention are also well-known and can be any elastomer derived from 1,3-butadiene or its halogenated analogs which has a glass transition temperature below ambient temperature and preferably not above about 5° C. Suitable elastomers include butadiene homopolymer, copolymers of butadiene with styrene, acrylonitrile and methacrylonitrile, and such homopolymers and copolymers modified by copolymerization therein of trace amounts (0.05 to 5%) of a functional comonomer, such as acrylic acid, methacrylic acid, maleic anhydride, fumaric acid, styrene and methyl methacrylate.

Polymer-in monomer syrups suitable for use in the present invention, compositionally as well as their preparation, are well-known in the art. Representative syrups, including precursor liquid monomer compounds containing at least one olefinically unsaturated group, and their preparation are disclosed in U.S. Pat. Nos. 3,333,025; 3,725,504; and 3,873,640. Briefly, such syrups are conveniently prepared by de-aerating the starting mixture consisting essentially of at least one polymerizable liquid olefinically unsatruated compound and, when used, polymer containing the group $(CH_2-CCl=CHCH_2)_n$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed, the polymer-in-monomer syrup is cooled. Preferably, the syrups have a viscosity in the range from about 500 to about 1,000,000 mPa's at 20° C.

Polymers containing the grouping $(CH_2-CCl=CHCH_2)_n$, wherein n is an integer, are well-known in the art under the name neoprene, which is produced by the polymerization of 2-chloro-1, 3-butadiene. Further elucidation would be superfluous.

Polyvinyl alkyl ethers suitable for use in the adhesive compositions which are described herein are well-known in the art. Such ethers will preferably contain one to 8, more preferably one to 4, carbon atoms in the alkyl moiety of said ether. Likewise, styrene-acrylonitrile polymers which are suitable for use in the invention are well-known.

Elastomeric polymeric materials having second order glass transition temperatures below about 5° C. can be effective in modifying room temperature flexibility of the adhesive bond. Especially preferred of such elastomers are polychloroprene rubber; polybutadiene rubber; butadiene copolymer rubbers such as acrylonitrile-butadiene, carboxylated acrylonitrile-butadiene and stryene-butadiene rubbers; polyacrylate rubbers such as poly(ethyl acrylate) and poly(ethyl acrylatehalogenate vinyl ether-acrylic acid) rubbers; and ethylene copolymers such as ethylene-vinyl acetate rubbers; and ethylene copolymers such as ethylene-vinyl acetate rubbers. Other elastomeric polymers having a glass transition temperature about 5° C. can be employed since, other than the low glass transion temperature, there are no other limitations on the identity of the elastomer except for the specific requirements of the particular adhesive being formulated, such as suitable molecular weight, viscosity characteristics and compatibility with the other ingredients of the adhesive.

Such elastomeric polymeric materials are particularly beneficial when incorporated in acrylic adhesives comprising at least one olefinically unsaturated polyurethane.

Polymeric materials having an intrinsic viscosity of 0.1 to about 1.3 which are suitable for use in the present invention can be obtained by the polymerization of 1 or more acrylic and nonacrylic monomers, including mixtures thereof. Exemplary polymeric materials include poly(methyl methacrylate/n-butylacrylate/ethylacrylate) (90/5/5%); poly(n-butyl methacrylate/isobutyl methacrylate) (50/50%); poly(n-butyl methacrylate) and poly(ethyl methacrylate). Preferably, the viscosity will be about midway in the recited range.

The use of polymeric materials having such intrinsic viscosities is especially beneficial in acrylic adhesives containing homopolymers and copolymers of 1,3-butadiene.

The following examples illustrate the composition and advantages of adhesives of the instant invention in a series of comparative tests varying essential ingredients of titanium dioxide and phenoxy resins. In the examples, the determination of the comparative efficacy of the various adhesive formulations is made through shear strength tests on specimens cured at room temperature, a low bake cure (350° F.) and an abuse bake cure (400° F.). The shear strength test was a lap shear test employed in accordance with ASTM 1002-79. All test coupons were prepared by solvent wiping. The bonding area was a one inch overlap of two strips with an adhesive thickness of 0.005 inch. Shear strengths were measured 24 hours after application.

Adhesive compositions were obtained by blending in a conventional manner the ingredients in the following Table.

EXAMPLE I

Addition of various thermoplastics
Benefit of Phenoxy Addition

|  | Control | #1 | #2 | #3 | #4 | #5 |
|---|---|---|---|---|---|---|
| Hycar 1072 | 9.16 | 7.32 | 6.87 | 6.54 | 5.49 | 4.58 |
| HEMA/TDI | 23.80 | 19.04 | 17.85 | 16.99 | 14.28 | 11.90 |
| Polystyrene | — | 10.0 | — | — | — | — |
| Acrylic | — | — | 10.0 | — | — | — |
| Polyanhydride | — | — | — | 10.0 | — | — |
| Phenoxy | — | — | — | — | 10.0 | — |
| Saran F310 (polyvinylidine fluoride) | — | — | — | — | — | 10.0 |
| THFMA | 40.29 | 42.23 | 45.21 | 47.35 | 54.17 | 60.14 |
| CUSA | 1.1 | 0.88 | 0.83 | 0.79 | 0.66 | 0.55 |
| PTSC | 0.73 | 0.58 | 0.55 | 0.52 | 0.44 | 0.37 |
| Fuming silica | 0.73 | 0.58 | 0.55 | 0.52 | 0.44 | 0.37 |
| HEMAP | 4.20 | 3.36 | 3.15 | 3.00 | 2.52 | 2.10 |
| $TiO_2$ | 20.0 | 16.0 | 15.0 | 14.28 | 12.0 | 10.0 |
| Shear Strengths: (psi) | | | | | | |
| RT Cured | 2420 | 2260 | 2030 | 1990 | 2420 | 2330 |
| Low Bake | 800 | 390 | 1510 | 740 | 2540 | 230 |
| Abuse Bake | 570 | 390 | 900 | 690 | 900 | 0 |
| Stability at 110° F. (one month) | OK | OK | OK | Physical incompatibility (separation) | OK | OK |

ABBREVIATIONS FOR EXAMPLES I-V
Hycar 1072 = carboxylated (poly 1,3-butadiene/acrylonitrile)
HEMA/TDI = hydroxyethylmethacrylate toluene diisocyanate
polystyrene = piccoelastic A75
acrylic = B-66
polyanhydride = Gulf PA-18
phenoxy = PKHJ
THFMA = tetrahydrofurfurylmethacrylate
CUSA = Copper Sacchrinate
PTSC = paratoluenesulfonyl chloride
fuming silica = HS-5
HEMAP = hydroxy ethyl methacrylate phosphate Example I clearly shows that the addition of various thermoplastics to a basic acrylic adhesive formulation results in a demonstration that a formulation containing 10 wt. percent phenoxy and 12 wt. percent titanium dioxide (No. 4) has a superior shear strength after baking. This is a clear demonstration of the improved heat stability of compositions of the instant invention incorporating phenoxy resins and titanium dioxide.

Adhesive compositions were obtained by blending in a conventional manner the ingredients in the following Table.

EXAMPLE II

EFFECT OF VARIOUS LEVELS OF PHENOXY

|  | Control | #1 | #2 | #3 | #4 | #5 |
|---|---|---|---|---|---|---|
| Hycar 1072 | 9.16 | 8.95 | 6.72 | 4.48 | 2.69 | — |
| HEMA/TDI | 23.80 | 18.85 | 18.53 | 18.18 | 17.91 | 17.51 |
| Phenoxy | — | 5.15 | 7.72 | 10.29 | 12.35 | 15.44 |
| THFMA | 40.29 | 40.29 | 40.29 | 40.29 | 40.29 | 40.29 |
| CUSA | 1.1 | 1.1 | 1.1 | 1.1 | 1.1 | 1.1 |
| PTSC | 0.73 | 0.73 | 0.73 | 0.73 | 0.73 | 0.73 |
| Fuming silica | 0.73 | 0.73 | 0.73 | 0.73 | 0.73 | 0.73 |
| HEMAP | 4.20 | 4.2 | 4.2 | 4.2 | 4.2 | 4.2 |
| $TiO_2$ | 20.0 | 20.0 | 20.0 | 20.0 | 20.0 | 20.0 |
| Shear Strengths: (psi) | | | | | | |
| RT Cured | 2240 | 2340 | 2330 | 2430 | 2510 | 2230 |
| Low Bake | 470 | 1060 | 950 | 1240 | 1480 | 1520 |
| Abuse Bake | 520 | 650 | 680 | 610 | 670 | 620 |

EXAMPLE II-continued

EFFECT OF VARIOUS LEVELS OF PHENOXY

|  | Control | #1 | #2 | #3 | #4 | #5 |
|---|---|---|---|---|---|---|
| 6 Week Stability at 110° F. | OK | OK | OK | OK | OK | Solid in 10 days |

Example II illustrates the effect of various levels of phenoxy on adhesive resins of this invention, showing that phenoxy levels of 5 to 15 wt. percent are preferred.

Adhesive compositions were obtained by blending in a conventional manner the ingredients in the following Table.

EXAMPLE III

EFFECT OF TiO$_2$ AND PHENOXY

|  | No Phenoxy or TiO$_2$ | With Phenoxy (No TiO$_2$) | With TiO$_2$ (No Phenoxy) | Phenoxy and TiO$_2$ |
|---|---|---|---|---|
| Hycar 1072 | 12.6 | 7.6 | 10.1 | 6.1 |
| HEMA/TDI | 20.2 | 15.2 | 16.1 | 12.1 |
| Phenoxy | — | 10.1 | — | 8.1 |
| THFMA | 63.2 | 63.2 | 50.4 | 50.4 |
| TiO$_2$ | — | — | 20.2 | 20.2 |
| Silica | 0.4 | 0.4 | 0.3 | 0.3 |
| CUSA | 0.6 | 0.6 | 0.5 | 0.5 |
| PTSC | 0.4 | 0.4 | 0.3 | 0.3 |
| HEMAP | 2.5 | 2.5 | 2.0 | 2.0 |
| Benzoquinone | 0.03 | 0.03 | 0.02 | 0.02 |
| RT Shear Strengths: (psi) | | | | |
| RT Cured Only | 1120 | 1860 | 1935 | 2210 |
| RT Plus Low Bake | 300 | 795 | 1980 | 2400 |

Example No. III illustrates that the composition incorporating both phenoxy resin and titanium dioxide yields an improved shear strength after baking.

Adhesive compositions were obtained by blending in a conventional manner the ingredients in the following Tables.

EXAMPLE IV

EFFECT OF TiO$_2$ - NO PHENOXY

|  | No TiO$_2$ | 10% | 20% | 30% | 40% | 50% | 60% |
|---|---|---|---|---|---|---|---|
| Hycar 1072 | 11.4 | 10.3 | 9.2 | 8.0 | 6.9 | 5.7 | 4.6 |
| HEMA/TDI | 29.8 | 26.8 | 23.8 | 20.8 | 17.9 | 14.9 | 11.9 |
| THRMA | 50.4 | 45.4 | 40.3 | 35.2 | 30.2 | 25.2 | 20.1 |
| TiO$_2$ | — | 10.0 | 20.0 | 30.0 | 40.0 | 50.0 | 60.0 |
| Cab-O-Sil | 0.9 | 0.8 | 0.7 | 0.6 | 0.5 | 0.5 | 0.4 |
| CUSA | 1.4 | 1.2 | 1.1 | 1.0 | 0.8 | 0.7 | 0.6 |
| PTSC | 0.9 | 0.8 | 0.7 | 0.6 | 0.5 | 0.5 | 0.4 |
| HEMAP | 5.3 | 4.7 | 4.2 | 3.7 | 3.2 | 2.6 | 2.1 |
| Shear Strength: | | | | | | | |
| RT Cured | 2090 | 2020 | 2150 | 2190 | 2110 | 1860 | 940 |
| 15'/350° F. | 600 | 2070 | 2230 | 2410 | 2150 | 2130 | 330 |
| 30'/350° F. | 450 | 370 | 590 | 640 | 2110 | 2020 | 430 |
| 45'/350° F. | 360 | 450 | 490 | 720 | 1180 | 1610 | 470 |
| 60'/350° F. | 250 | 420 | 620 | 760 | 1300 | 1600 | 400 |
| 90'/350° F. | 340 | 480 | 590 | 700 | 1820 | 1560 | 360 |
| 120'/350° F. | 250 | 400 | 620 | 550 | 1220 | 1880 | 310 |

EXAMPLE V

USE OF TiO$_2$ AND PHENOXY (ADDITIONAL)

|  | 0 | 10% | 20% | 30% | 35% | 40% | 45% | 50% |
|---|---|---|---|---|---|---|---|---|
| Hycar 1072 | 6.2 | 5.6 | 5.0 | 4.4 | 4.1 | 3.7 | 3.4 | 3.1 |
| HEMA/TDI | 16.2 | 14.6 | 13.0 | 11.4 | 10.5 | 9.7 | 8.9 | 8.1 |
| Phenoxy | 11.4 | 10.2 | 9.1 | 8.0 | 7.4 | 6.8 | 6.3 | 5.7 |
| THFMA | 61.6 | 55.4 | 49.2 | 43.1 | 40.0 | 36.9 | 33.9 | 30.8 |
| TiO$_2$ | — | 10.0 | 20.0 | 30.0 | 35.0 | 40.0 | 45.0 | 50.0 |
| Cab-O-Sil | 0.5 | 0.45 | 0.4 | 0.35 | 0.30 | 0.30 | 0.30 | 0.25 |
| CUSA | 0.75 | 0.70 | 0.60 | 0.50 | 0.50 | 0.45 | 0.40 | 0.40 |
| HSC | 0.5 | 0.45 | 0.4 | 0.35 | 0.30 | 0.30 | 0.30 | 0.25 |
| HEMAP | 2.9 | 2.6 | 2.3 | 2.0 | 1.9 | 1.7 | 1.6 | 1.4 |
| Shear Strengths: (psi) | | | | | | | | |
| RT Cured Only | 2120 | 2100 | 2510 | 2570 | 2480 | 2220 | 850 | 740 |
| RT and Low Bake | 600 | 1930 | 2740 | 2700 | 2740 | 2070 | 1630 | 1500 |

Examples IV and V are further illustrations of the effect of titanium dioxide and phenoxy concentrations in the compositions of the present invention on shear strength at room temperature curing and at elevated temperature curing. These examples further illustrate the scope of the invention and the surprising contribution of titanium dioxide and phenoxy resin to improve heat stability of acrylic adhesives. These examples are intended for illustrative purposes only and are not intended to limit the scope of the invention.

We claim:

1. The method of adhering at least two metal surfaces, one to the other, which comprises applying to at least one of the surfaces an adherent quantity of a one component adhesive composition which is activated upon contact with a said metal surface, engaging the said two surfaces with the said adhesive composition therebetween and maintaining the metal surfaces and interposed adhesive composition in engagement until the adhesive composition has cured sufficiently to bond said surfaces, said adhesive composition consisting essentially of:

(A) at least one olefinically unsaturated monomer;
(B) titanium dioxide or at least one phenoxy resin comprised of recurring units represented by the formula

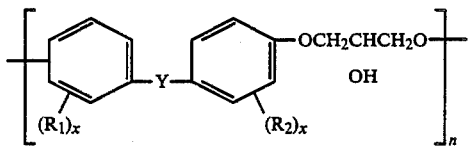

wherein y is selected from the group consisting of alkylene, oxygen, thio, sulfonyl and carboxyl; $R_1$ and $R_2$ are selected from the group consisting of hydrogen, halogen, alkyl, aloxy, cycloalkyl, alkylenecycloalkyl, aryl; x is zero or an integer 1-4; n is 10 to 250; or mixtures of titanium dioxide and said phenoxy resin;

(C) a polymeric material selected from the group consisting of
  (1) at least one olefinically unsaturated urethane reaction product of at least one isocyanate-functional prepolymer and at least one hydroxy-function monomer having at least one unit of polymerizable olefinic unsaturation, such reaction product being characterized by the presence of at least two units of olefinic unsaturation and the substantial absence of free isocyanate groups;
  (2) at least one butadiene-based elastomeric polymeric material selected from the group consisting of
    (a) homopolymer of butadiene;
    (b) copolymer of butadiene and at least one monomer copolymerizable therewith selected from the group consisting of sytrene, acrylonitrile, methacrylonitrile and mixtures thereof;
    (c) modified elastomeric polymeric material selected from the group consisting of butadiene homopolymer and copolymer as previously defined, such homopolymer and copolymer having been modified by copolymerization thereof with trace amounts up to 5 percent by weight, based on weight of modified elastomeric material, of at least one functional monomer; and
    (d) mixtures thereof;
  (3) at least one polymer-in-monomer syrup consisting essentially of
    (a) from 10 to 98 percent by weight of at least one olefinically unsaturated monomeric compound having at least one —C═C—group;
    (b) from 2 to 90 percent by weight of at least one polymer derived from such (3)(a) monomers;
    (c) from zero to 30 percent by weight of at least one polymer containing the group $(CH_2-CCl=CHCH_2)_n$, wherein n is an integer;
    wherein (3)(b) is present as a partial polymerization product of (3)(a) or of (3)(a) in the presence of (3)(c); the mixture of (3)(a) and (3)(b) or of (3)(a), (3)(b) and (3)(c) being a syrup of polymer dissolved or dispersed in unpolymerized monomer;
  (4) at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;
  (5) at least one homopolymer or copolymer of at least one olefinically unsaturated monomer selected from the group consisting of styrene and alkyl or hydroxyalkyl esters of acrylic and methacrylic acid, said ester having one to 18 carbon atoms in the alkyl moiety; and
  (6) mixtures of such polymeric materials;
(D) a Bronsted acid compound having at least one organic or inorganic acid group;
(E) at least one compound containing at least one sulfonyl halide group having the structure

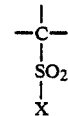

wherein X is selected from the group consisting of chlorine bromine or iodine; and
(F) at least one organic or inorganic compound containing at least one reducible transition metal, said metal having its valence electrons in a "d" subshell, said metal being selected from the elements of classes Ib, IIb, IIIb, IVb, Vb, VIb, VIIb, VIII on the periodic chart of the elements,
wherein the amount of said phenoxy based copolymer or homopolymer is in the range of 1 to 30 percent by weight; the amount of said olefinically unsaturated monomer is in the range from 10 to 90 percent by weight; the amount of said olefinically unsaturated urethane reaction product is in the range from 10 to 90 percent by weight; the amount of said butadiene-based elastomeric polymeric material is in the range from 1 to 30 percent by weight; the amount of said Bronsted acid is in the range from 0.05 to 5 percent by weight; the amount of said sulfonyl halide-containing compound is in the range from 0.05 to 5 percent by weight; and the amount of titanium dioxide is in the range from 1 to 50 percent by weight; said weight percents being based on the total weight of ingredients (A)-(F), inclusive.

2. A method according to claim 1 wherein the component B is at least one of said phenoxy resins.

3. A method according to claim 1 wherein component B is titanium dioxide.

4. A method according to claim 1 wherein component B is a mixture of about 1 to 30 percent by weight of said phenoxy resin and about 1 to 50 percent by weight of titanium dioxide.

5. A method according to claim 4 wherein the amount of titanium dioxide is about 10 to 25 percent by weight.

6. A shelf-stable, one package structural adhesive composition, heat stable under paint curing conditions and useful for bonding galvanized steel, consisting essentially of in admixture
(A) at least one olefinically unsaturated monomer:
(B) titanium dioxide or at least one phenoxy resin comprised of recurring units represented by the formula

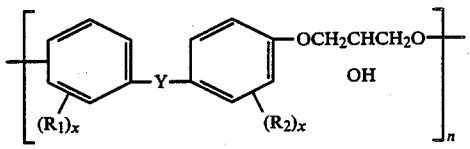

wherein y is selected from the group consisting of alkylene, oxygen, thio, sulfonyl and carboxyl; $R_1$ and $R_2$ are selected from the group consisting of hydrogen, halogen, alkyl, alkoxy, cycloalkyl, alkylenecycloalkyl, aryl; x is zero or an integer 1-4; n is 10 to 250; or mixtures of titanium dioxide and said phenoxy resin;

(C) a polymeric material selected from the group consisting of
  (1) at least one unsaturated urethane reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
  (2) at least one butadiene-based elastomeric polymeric material selected from the group consisting of
    (a) homopolymer of butadiene;
    (b) copolymer of butadiene and at least one monomer copolymerizable therewith selected from the group consisting of sytrene, acrylonitrile, methacrylonitrile and mixtures thereof;
    (c) modified elastomeric polymeric material selected from the group consisting of butadiene homopolymer and copolymer as previously defined, such homopolymer and copolymer having been modified by copolymerization thereof with trace amounts up to 5 percent by weight, based on weight of modified elastomeric material, of at least one functional monomer; and
    (d) mixtures thereof;
  (3) at least one polymer-in-monomer syrup consisting essentially of
    (a) from 10 to 98 percent by weight of at least one olefinically unsaturated monomeric compound having at least one —C═C—group;
    (b) from 2 to 90 percent by weight of at least one polymer derived from such (3) (a) monomers;
    (c) from zero to 30 percent by weight of at least one polymer containing the group $(CH_2-CCl=CHCH_2)_n$, wherein n is an integer;
    wherein (3)(b) is present as a partial polymerization product of (3)(a) or of (3)(a) in the presence of (3)(c); the mixture of (3)(a) and (3)(b) or of (3)(a), (3) (b) and (3)(c) being a syrup of polymer dissolved or dispersed in unpolymerized monomer;
  (4) at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;
  (5) A least one homopolymer or copolymer of at least one olefinically unsaturated monomer selected from the group consisting of styrene and alkyl or hydroxy esters of acrylic and methacrylic acid, said ester having one to 18 carbon atoms in the alkyl moiety; and
  (6) mixtures of such polymeric materials;

(D) a Bronsted acid compound having at least one organic or inorganic acid group;

(E) at least one compound containing at least one sulfonyl halide group having the structure $$-\underset{\underset{X}{\overset{\displaystyle |}{SO_2}}}{\overset{\displaystyle |}{C}}-$$

wherein X is selected from the group consisting of chlorine bromine or iodine; and (F) at least one organic or inorganic compound containing at least one reducible transition metal, said metal having its valence electrons in a "d" subshell, said metal being selected from the elements of classes Ib, IIb, IIIb, IVb, Vb, VIb, VIIb, VIII on the periodic chart of the elements;

wherein said phenoxy resin is in the range of about 1 to 30 percent by weight; the amount of said olefinic monomer is in the range from 10 to 90 percent by weight; the amount of said olefinically unsaturated urethane reaction product is in the range from 10 to 90 percent by weight; the amount of said Bronsted acid is in the range from 0.05 to 20 percent by weight; the amount of said sulfonyl halide-containing compound is in the range from 0.05 to 5 percent by weight; the amount of said transition metal compound is in the range from 0.05 to 5 percent by weight; and the amount of said titanium dioxide is in the range from 1 to 50 percent by weight; said weight percents being based on the total weight of ingredients (A)-(F), inclusive.

7. An adhesive composition according to claim 6 wherein said compound is selected from the group consisting of inorganic acids and organic or inorganic partial esters of inorganic acids.

8. An adhesive composition according to claim 6 wherein said acid compound is selected from the group consisting of organic acids and organic or inorganic partial esters of organic acids.

9. An adhesive composition according to claim 6 wherein the component B is at least one of said phenoxy resins.

10. An adhesive composition according to claim 9 wherein said phenoxy resin is the polymerization product of Bisphenol A and epichlorohydrin.

11. An adhesive composition according to claim 9 wherein said phenoxy resin is the polymerization product of Bisphenol A and the diglycidylether of Bisphenol A.

12. An adhesive composition according to claim 6 wherein component B is titanium dioxide.

13. An adhesive composition according to claim 6 wherein component B is a mixture of about 1 to 30 percent by weight of said phenoxy resin and about 1 to 50 percent by weight titanium dioxide.

14. An adhesive composition according to claim 13 wherein the amount of titanium dioxide is about 10 to 25 percent by weight.

15. An adhesive composition according to claim 6 wherein the said olefinically unsaturated monomer is tetrahydrofurfurylmethacrylate.

* * * * *